United States Patent
Nadeau et al.

(10) Patent No.: US 11,537,617 B2
(45) Date of Patent: Dec. 27, 2022

(54) DATA SYSTEM CONFIGURED TO TRANSPARENTLY CACHE DATA OF DATA SOURCES AND ACCESS THE CACHED DATA

(71) Applicant: Dremio Corporation, Santa Clara, CA (US)

(72) Inventors: Jacques Nadeau, Santa Clara, CA (US); Tomer Shiran, Mountain View, CA (US); Arvind Arun Pande, Telangana (IN); Thomas W. Fry, San Mateo, CA (US)

(73) Assignee: Dremio Corporation, Santa Clara, CA (US)

( * ) Notice: Subject to any disclaimer, the term of this patent is extended or adjusted under 35 U.S.C. 154(b) by 0 days.

(21) Appl. No.: 16/861,048

(22) Filed: Apr. 28, 2020

(65) Prior Publication Data

US 2020/0349163 A1 Nov. 5, 2020

Related U.S. Application Data

(60) Provisional application No. 62/840,928, filed on Apr. 30, 2019.

(51) Int. Cl.
| | |
|---|---|
| *G06F 16/00* | (2019.01) |
| *G06F 16/2455* | (2019.01) |
| *G06F 16/2453* | (2019.01) |
| *G06F 16/2457* | (2019.01) |
| *G06F 16/182* | (2019.01) |
| *G06F 16/248* | (2019.01) |
| *G06F 16/27* | (2019.01) |

(Continued)

(52) U.S. Cl.
CPC ...... *G06F 16/24552* (2019.01); *G06F 16/137* (2019.01); *G06F 16/182* (2019.01); *G06F 16/242* (2019.01); *G06F 16/248* (2019.01); *G06F 16/24542* (2019.01); *G06F 16/24573* (2019.01); *G06F 16/273* (2019.01)

(58) Field of Classification Search
CPC .... G06F 16/137; G06F 16/182; G06F 16/242; G06F 16/24542; G06F 16/24552; G06F 16/24573; G06F 16/248; G06F 16/273
USPC .................................................. 707/600–899
See application file for complete search history.

(56) References Cited

U.S. PATENT DOCUMENTS

| | | | |
|---|---|---|---|
| 10,795,817 B2 * | 10/2020 | Keymolen | .......... G06F 12/0815 |
| 2014/0047190 A1 * | 2/2014 | Dawkins | ............ H04L 67/5682 |
| | | | 711/E12.071 |

(Continued)

*Primary Examiner* — Michelle N Owyang
(74) *Attorney, Agent, or Firm* — Perkins Coie LLP

(57) ABSTRACT

The disclosed embodiments include a method for caching by a data system. The method includes automatically caching a portion of a data object from an external data source to a local cluster of nodes in accordance with a unit of caching. The portion of the data object can be selected for caching based on a frequency of accessing the portion of the data object. The portion of the data object in the cache is mapped to the external data source in accordance with a unit of hashing. The method further includes, responsive to the data system receiving a query for data stored in the external data source, obtaining query results that satisfy the received query by reading the portion of the cached data object instead of reading the data object from the external data source.

21 Claims, 5 Drawing Sheets

(51) Int. Cl.
    *G06F 16/13*     (2019.01)
    *G06F 16/242*    (2019.01)

(56) References Cited

U.S. PATENT DOCUMENTS

| | | | |
|---|---|---|---|
| 2014/0330785 A1* | 11/2014 | Isherwood | G06F 11/1446 |
| | | | 707/640 |
| 2019/0034341 A1* | 1/2019 | Shilane | G06F 12/0833 |
| 2019/0057090 A1* | 2/2019 | Xie | G06F 16/13 |
| 2019/0079864 A1* | 3/2019 | Shi | G06F 12/126 |
| 2019/0102412 A1* | 4/2019 | MacNicol | G06F 16/2471 |
| 2019/0146920 A1* | 5/2019 | Hua | G06F 9/00 |
| | | | 711/141 |

\* cited by examiner

DATA SYSTEM CONFIGURED TO TRANSPARENTLY CACHE DATA OF DATA SOURCES AND ACCESS THE CACHED DATA

CROSS-REFERENCE TO RELATED APPLICATION

This application claims priority to U.S. provisional patent application Ser. No. 62/840,928 filed Apr. 30, 2019 and titled "CLOUD CACHING SOLUTION," which is incorporated herein in its entirety by this reference thereto.

TECHNICAL FIELD

The disclosed teachings generally relate to techniques of a data system or related platform. The disclosed teachings more particularly relate to a data system or related platform that can automatically cache and update cached data at a local cluster of nodes to accelerate read requests for data at external systems mapped to the local cluster.

BACKGROUND

With the advent of big data, organizations can cost-effectively store significantly larger volumes of data than was previously possible in largescale data lakes. However, traditional tools such as SQL databases are unable to effectively store or process the larger volumes of data due to cost and technology limitations. As a result, to analyze largescale datasets, organizations typically utilize SQL-on-Big Data tools that provide users with SQL-based access to data stored in a data lake.

There are two common methods that utilize SQL-on-Big Data. The first method is to execute SQL processing of data in the same cluster where the data is stored (e.g., HADOOP) with the goal of making HADOOP look like an SQL database. Examples include APACHE DRILL, APACHE IMPALA, PRESTO, HIVE, and SPARK SQL. A common drawback is that the latency of these systems prevents interactive analytics and is more oriented with batch style processing.

The second method is to extract subsets of data or aggregations of data separate from the data lake and store these extracts as OLAP cubes outside of the data lake. Examples include KYLIN and ATSCALE. This approach provides more interactive speed, but limits users to data that has been pre-extracted from the data lake and defined beforehand, which prevents ad-hoc analytics on the full dataset. As such, a need exists for an alternative to common SQL-on-Big Data approaches.

SUMMARY

The disclosed embodiments include a method for caching by a data system. The method includes automatically caching at least a portion of a data object from an external data source to a local cluster of nodes in accordance with a unit of caching. In one example, the data object is automatically selected for caching based on the frequency that the data object is accessed (e.g., exceeds a threshold). Any portion of the data object in the cache is mapped to the external data source in accordance with a unit of hashing. The method further includes, responsive to the data system receiving a query for data stored in the external data source, obtaining a query result that satisfies the query by reading the portion of the cached data object instead of reading the data object from the external data source.

DETAILED DESCRIPTION

Figure 1:
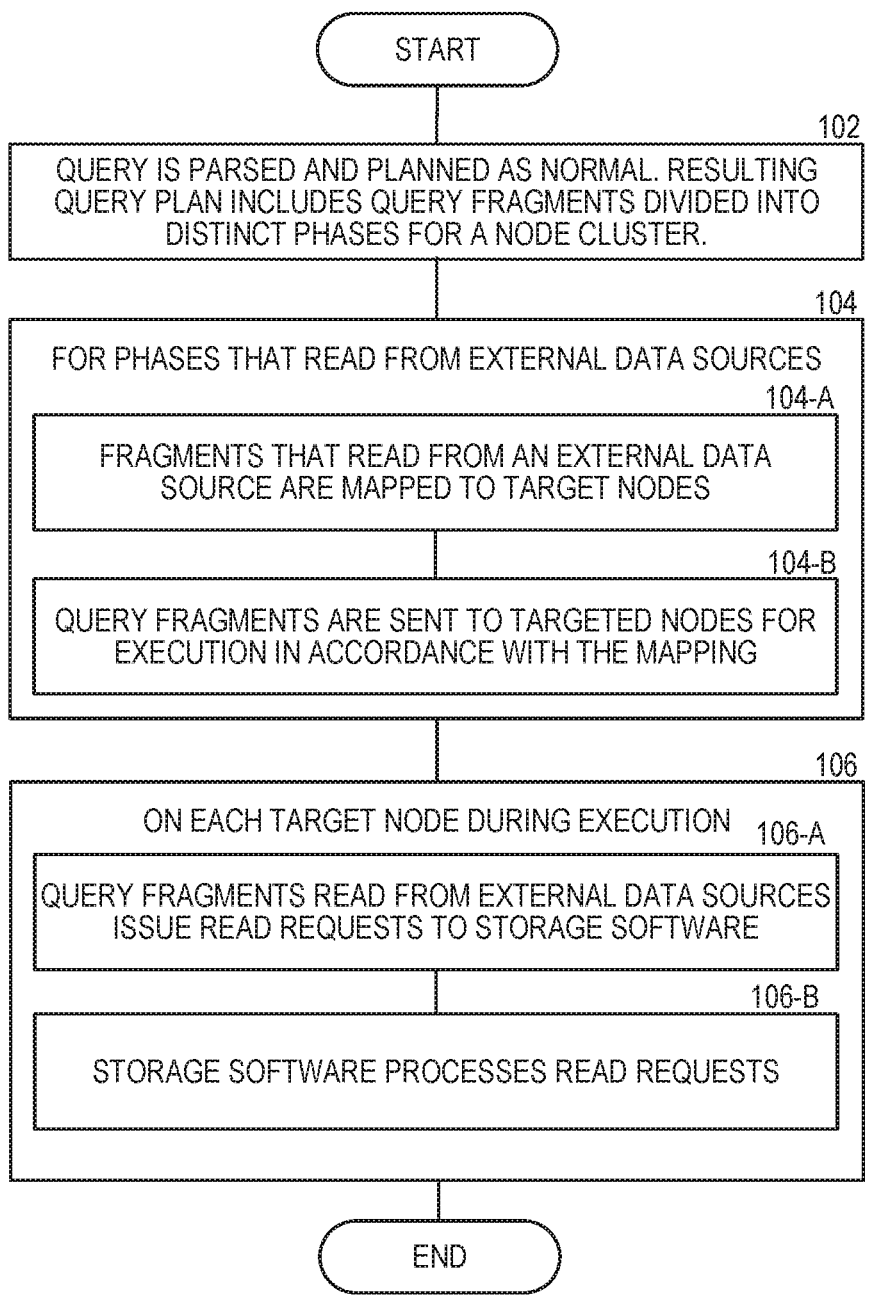
FIG. 1 is a flow diagram that illustrates a process for a query request according to some embodiments of the present disclosure.

The embodiments set forth below represent the necessary information to enable those skilled in the art to practice the embodiments and illustrate the best mode of practicing the embodiments. Upon reading the following description in light of the accompanying figures, those skilled in the art will understand the concepts of the disclosure and will recognize applications of these concepts that are not particularly addressed herein. These concepts and applications fall within the scope of the disclosure and the accompanying claims.

The purpose of terminology used herein is only for describing embodiments and is not intended to limit the scope of the disclosure. Where context permits, words using the singular or plural form may also include the plural or singular form, respectively.

As used herein, unless specifically stated otherwise, terms such as "processing," "computing," "calculating," "determining," "displaying," "generating," or the like, refer to actions and processes of a computer or similar electronic computing device that manipulates and transforms data represented as physical (electronic) quantities within the computer's memory or registers into other data similarly represented as physical quantities within the computer's memory, registers, or other such storage medium, transmission, or display devices.

As used herein, terms such as "connected," "coupled," or the like, may refer to any connection or coupling, either direct or indirect, between two or more elements. The coupling or connection between the elements can be physical, logical, or a combination thereof.

The disclosed embodiments include a platform as an alternative to the SQL-on-Big Data approaches. In one example, the platform provides a highly efficient SQL execution engine that processes data of a data lake separate from a data lake. The platform can use a variety of techniques to efficiently process data remotely from a data source as described in U.S. patent application Ser. No. 16/392,483, filed on Apr. 23, 2019 and titled "OPTIMIZED DATA STRUCTURES OF A RELATIONAL CACHE WITH A LEARNING CAPABILITY FOR ACCELERATING QUERY EXECUTION BY A DATA SYSTEM" and U.S. patent application Ser. No. 15/631,903, filed on Jun. 23, 2017 and titled "SELF-SERVICE DATA PLATFORM,"

each of which is incorporated herein in its entirety. The platform and associated features offer a common memory format that help speed up data transfer. A platform can accelerate query executions by using optimized data structures, referred to herein as "reflections," which can reside in memory or on persistent storage. The reflections enable end-users to easily specify which data from a data lake (or other data source) to pre-extract, in either raw or aggregation form.

Despite the use of accelerations, performance is slower when users access raw data stored in the data lake where that data has not been specified to be pre-extracted for a reflection. As a result, for users to experience interactive speeds over large datasets, users need to manually create reflections for data so that the data is pre-extracted and stored in the platform for rapid query execution. Additionally, in cloud installations, customers commonly use a cloud provider's own data lake services to store reflections (e.g., AMAZON S3 or AZURE data lake storage (ADLS)). In these cloud-based environments, reflections themselves are slower than desired due to the performance limitations of the cloud provider's data lake solutions.

The disclosed embodiments include a data system that solves the problems of existing systems. In some embodiments, data that is stored in an external data lake, and is commonly accessed, is automatically stored on a local cache storage system. For example, the data is stored on a platform's cluster of nodes by using the cluster's own local disk resources without requiring user input. By storing data locally, it is available immediately for processing and users experience real-time or near real-time interactive performance.

Embodiments of the data system offer various benefits. Firstly, data stored in a data lake can be accelerated without user input or needing a user to specify a reflection. Instead, the most commonly (e.g., frequently) accessed data is automatically accelerated. Secondly, the reflections that are stored on external data lakes, as commonly configured in cloud environments, do not experience a performance degradation because commonly accessed reflections are cached locally. In addition, the caching architecture is designed to flexibly support any type of external data source, runtime changes to cluster configuration due to a node removal or inclusion, data changes on external systems which are outside the platform, multiple execution engines in a single cluster, high performance by sending compute to nodes were data is cached, and high concurrency by creating multiple cached copies of the same data on multiple nodes if highly accessed.

Unit of Hashing

An architecture design concept of the disclosed embodiments involves mapping (e.g., linking) external data objects to nodes of the platform. A "unit of hashing" defines the mapping for a particular external data object, including which compute node of the platform that the data object should be cached to, and ensures that data objects are evenly distributed across all active nodes. The term "hashing" refers to the use of a hash function to index a hash table. In particular, the hash function can be used to map data of arbitrary size to fixed-size values. The values returned by the hash function are called hash values or simply hashes. The values can be used to index a fixed-size table called the hash table.

In some embodiments, the mapping between the external data objects and the nodes of the platform is made by considering the following combination of inputs and only these inputs: (a) cluster membership, which refers to a target execution engine's cluster status including number of nodes configured and their current state; (b) file type, which refers to the type of file; (c) file path and name, which refers to, for file system sources, the name of the target file and includes a full path address and, for relational database sources, the object's unique path such as database.schema.table; and (d) file or dataset split details. In some embodiments, the mapping considers a file version in addition to the aforementioned combination. The file version refers to the version of the external file such as, for example, eTag information on AMAZON S3 or atime or mtime information on a file system.

As used here, "atime" refers to an "access time," which is a timestamp that indicates a time that a file has been accessed. The file may have been opened by a user, or may have been accessed by some other program or a remote machine. Anytime a file has been accessed, its access time changes.

As used herein, "mtime" refers to a "modification time," which indicates the time the contents of the file has been changed (only the contents, not attributes). For instance, if a user opens a file and changes some (or all) of its content, its mtime gets updated. If the user change a file's attribute, such as a read-write permissions or metadata, its mtime doesn't change, but its "ctime" or "change time" will change.

The same hash function can be applied to the inputs (a) through (d) indicated earlier to determine the node on which an external data object is cached. The same hash function can be utilized for other functions as well. An advantage of using the same hash function is that multiple rings can be defined to create multiple mappings. A ring can be a configuration in which a function or device is logically or physically connected to two others, for example, as if it were connected end-to-end.

In one example, if one ring is used, each external data object is mapped to a single compute node of the platform. However, if two rings are used, each external data object is mapped to two compute nodes (e.g., a primary node and a secondary node). As the number of rings increases, each external data object can be mapped to a corresponding number of compute nodes. A benefit of this approach is that data in very high demand can be mapped to multiple compute nodes such that work on that data can be sent to multiple nodes for higher performance or greater concurrency.

The data system can gracefully handle a node failure event without losing data cached in other nodes. For example, if an execution engine of the platform has ten nodes, then external data objects can be evenly distributed across those ten nodes. If a single node fails, data objects mapped to other nodes are not necessarily impacted while data objects mapped to the failed node can be remapped to the remaining nine nodes in a manner that evenly distributes the data objects that were mapped to the failed node across the remaining nine nodes. Doing so avoids hot spots in the data system by evenly spreading the additional load and data from a failed node to the remaining nodes. This is advantageous over other methods such as mirroring, which creates hot spots because all processing from a failed node is targeted to another node.

By including the file type, path, name and split information as input to the unit of hashing, any type of external data source may be cached and evenly distributed in accordance with the algorithm described herein. Moreover, in traditional network-attached storage (NAS) file systems, a file's full path and file name can be considered. In object storage systems, the bucket, path and object name can be considered. In distributed file systems such as a HADOOP distributed file system (HDFS), partitioning and split information can be considered.

A challenge when caching data stored on external systems is how to identify when data changes occur, which invalidates previously cached data. By including the data object's version in the hashing algorithm, the cache's data object to node mapping is only valid for a single version of the data object. As such, if data is changed, then the mapping is both invalidated and the data object is remapped. Different systems can implement different methods to track file versions. Data lake storage can include a hash of a data file's contents. For example, in AMAZON S3 this is called the eTag. In another example, file systems store a last modified time which changes every time a file is updated. This information can be used to track changes in data objects.

Unit of Caching

Another architecture design concept of the disclosed embodiments involves identifying what data within a data object to cache. Specifically, after identifying the node on which to cache a data object, the disclosed embodiments can determine the scope of the data object to cache on the identified node. Hence, instead of caching an entire data object, which could be many GBs or TBs in size, only the frequently accessed sections of a data object can be cached. This can be important because, in many file formats, workloads only access certain distinct parts of a file and other parts are not used. For example, in PARQUET, files that store data in columnar format and a workload will only access sections of a file associated with the columns in use.

The disclosed embodiments do not require specific knowledge of a file format structure to support numerous diverse file formats, including existing and future unknown formats. In some embodiments, data objects are divided into distinct sections of a specified size, for example, into separate 1 MB sections. The size of each distinct section can be configurable. Each distinct section can be cached separately based on a given section's usage. In this manner, commonly accessed regions of a data object are cached but the caching algorithm is flexible and does not require specific knowledge of the file format in use. Additionally, a default section size may be tuned depending on the file type. For example, different default section sizes can be defined for PARQUET versus CSV files based on observed performance.

Flexibility in Cache Eviction

The architecture of the disclosed platform can include higher level parts of a software stack that handle reading of a given file format and understand file format specific structures that could benefit caching effectiveness. For example, in PARQUET files, the footer contains key file attribute information that is commonly accessed on every read. As such, it is beneficial to always keep the footer in cache if any other part of the data object is in the cache. Accordingly, the disclosed platform can automatically keep the footer in cache if any other part of a PARQUET file is stored in the cache.

To support this function, suggestions or "hints" from higher levels of software, such as a file format reader or even a query itself, can be passed to the caching algorithm to help determine which data sections to store in cache and how "aggressively" to do so. That is, a "hint" may include information that indicates portions of data sections to cache. The "aggressiveness" refers to a degree or likelihood of caching the data section. In the example of PARQUET files, a hint is passed with read requests for footer data and specifies to always cache these sections if any other part of the data object is cached. Hints can also specify to store or pin certain data sections or even whole files in cache, or to pre-warm (e.g., pre-load in cache) certain sections of a file.

Although some examples of the data system are described as supporting AMAZON S3 and MICROSOFT ADLS storage systems and files stored in PARQUET format, the disclosed embodiments are not so limited. Instead, the data system and related platform can be implemented with a variety of additional data sources and file formats.

There are multiple benefits of the disclosed data system and related platform. For example, users can experience higher performance because the data system can automatically identify commonly accessed data and store it on nodes of the platform. That is, users do not have to manually configure external or raw reflections in every case. In contrast, current best practices require creating a raw reflection on external data sources so that data is pre-extracted and stored in the platform. In these prior systems, either all data is pre-extracted or users have to manually specify data ranges of interest. In contrast, with the disclosed data system, the platform can automatically identify ranges and cache extracted data.

Further, caching can be automatically enabled for all types of external data sources, without any specific coding required for new data sources or file formats. The cached data can be evenly distributed across resources, and the system can gracefully handle resource failures as indicated earlier. The cached data that can be lost due to the failed resources is evenly spread across any remaining resources to prevent hot spots. The reflections stored on external storage systems (e.g., NAS, AMAZON S3, ADLS) do not experience degradation when cached locally. This is especially important in public cloud deployments where customers usually configure reflections on external storage systems.

The disclosed data system creates a consistent user experience. That is, the experiences of users on existing systems vary between different data services and configurations due to the capabilities of external data systems that are outside of the platform's control. Caching not only improves performance but creates a consistent experience across different environments and storage services. Accordingly, the disclosed embodiments offer a wide impact and are cost-effective, which improves the experience of all users by using available local resources.

The disclosed embodiments also include a technique for co-locating compute resources and data. For example, knowledge of which nodes operate on and cache data by data object can be known during query planning and scheduling because all inputs to the hash function are known at query planning time. To further improve performance, the parts of a query plan that operate on specific data objects can be scheduled on the nodes where that data is or would be cached. Doing so sends the compute for a query to the nodes where data is stored, which prevents the need to transmit data across nodes within the platform cluster and improves performance while always reading locally from cache.

The disclosed data system also includes an embodiment with multiple execution engines (e.g., virtual execution engines). For example, a platform can divide a cluster into multiple smaller execution engines. Doing so enables higher concurrency compared to a single large pool by having multiple pools of resources to process user requests. In some embodiments, the cache's mapping of data objects to nodes is defined separately for each individual execution engine. This enables each execution engine to have its own cache for acceleration purposes. Moreover, this is beneficial if different execution engines are used for different workloads where they will cache different data objects or to cache the same data objects multiple times if workloads are run many times and execution is spread across multiple execution engines.

The disclosed embodiments include various process flows. For example, FIG. 1 is a flow diagram that illustrates a process 100 for processing a query request. As shown, the process 100 includes end-to-end steps that are relevant to caching and performed to process a query (e.g., an SQL query). In step 102, a query is parsed and planned as normally done with existing techniques. The result of the parsing and planning is a query plan that includes query fragments divided into distinct phases, where each phase can be run in series or parallel on a cluster of nodes, where work for the phases is divided over the nodes. For example, the phases can be processed over distributed SQL engines.

In step 104, the sub-steps 104-A and 104-B are performed for phases that are applied to read from external data sources. In step 104-A, query fragments that are read from an external data source are mapped to a target node. This mapping is known during query planning time prior to execution because the mapping may only consider the unit of hash inputs which are known at planning time. The unit of hashing is based on a cluster configuration, file type, file path and name, file split, or partition (e.g., split) details. In step 104-B, query fragments are sent to the targeted nodes for normal execution by using the mapping from step 104-A.

In step 106, the sub-steps 106-A and 106-B are performed on each node during execution. In step 106-A, query fragments read from external data sources cause read requests to issue for a storage software layer as normally done in existing techniques. The read requests can be of any size and do not necessarily correlate to a unit of caching. The format reader that is responsible for parsing each file type may optionally add hints to the read request.

In step 106-B, the storage software layer (e.g., including a format reader) of the data system processes the read requests. In particular, each file is logically divided into discrete logical blocks (e.g., unit of caching). For example, each file can be divided into 1 MB-sized logical blocks and each read request can be mapped to one or more of the logical blocks. For example, a read request for 2 KB starting at position 1.5 MB would map to the second logical block in the file if logical blocks were 1 MB in size. A lookup process is performed to determine if the logical block is stored in local cache or a local metadata store. Additionally, the file's version can also be looked-up (eTag, mtime, etc).

Each node can maintain its own database including information of logical blocks cached locally and a current file version. The lookup is local to individual node because the unit of hashing already maps a file to a node. As a result, each node only needs to keep track of which files/logical block it has cached because there are no dependencies on the cache states of other nodes. Even if multiple hash rings are used to map a file to multiple nodes, each node can track only its own cache status. This has performance and simplification advantages. For example, if the logical block is currently in the local cache, then data is read and returned from the local cache, otherwise it is read from the external data source.

Figure 2:
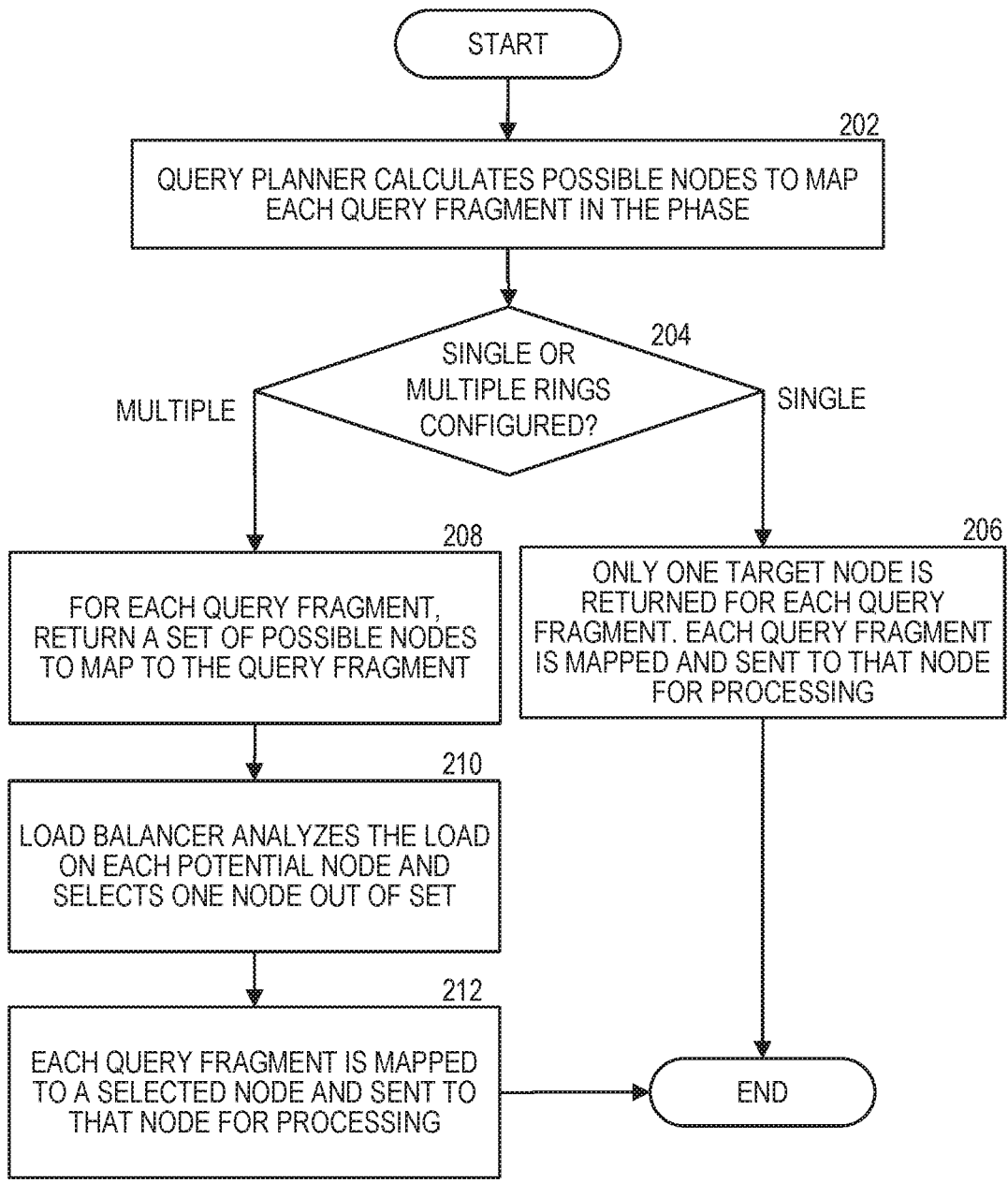
FIG. 2 is a flow diagram that illustrates a process of a query planner and load balancing technique according to some embodiments of the present disclosure.

FIG. 2 is a flow diagram that illustrates a process 200 of a query planner to perform load balancing. The steps of the process 200 can be performed for each phase that reads from an external data source. In step 202, the query planner calculates one or more possible nodes to map each query fragment in a phase. In some embodiments, the mapping is calculated by using cluster configuration, file type, file path and name, file split or partition details as inputs to the consistent hash algorithm (or some other hash algorithm), which returns possible node mappings.

In step 204, a process is performed to determine whether one or more rings are configured. In step 206, if a single ring is configured, only one target node is returned for a given query fragment and each query fragment is mapped and sent to that node for processing. In step 208, if multiple rings are configured, for each query fragment, a set of one or more possible nodes to map the query fragment is returned. In some embodiments, each ring can create a unique evenly distributed mapping of files-to-nodes across the cluster of nodes. In step 210, a load balancer analyzes the load on each potential node and selects one node out of the set. Multiple load balancing strategies can be used to select a node. For example, if a given file is heavily used, the load balancer can decide to enable multiple rings for that file so that multiple copies are cached locally, and the load balancer can map requests for that file to multiple nodes with additional compute resources. In step 212, each query fragment is mapped to a selected node and sent to that node for processing.

Figure 3:
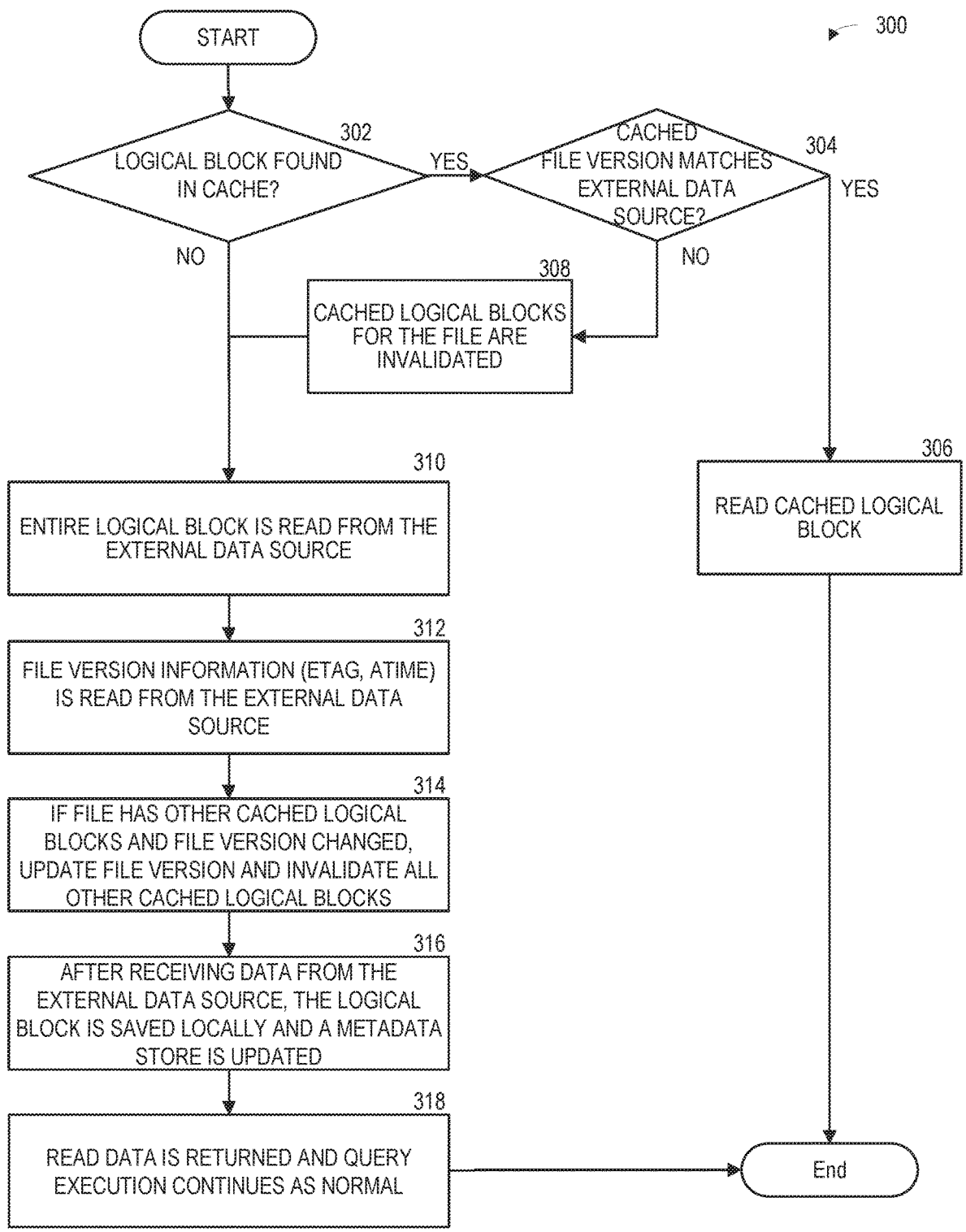
FIG. 3 is a flow diagram that illustrates a process for logical block reading according to some embodiments of the present disclosure.

FIG. 3 is a flow diagram that illustrates a process 300 for logical block reading. In step 302, it is determined whether a logical block was found in cache. If so, the process 300 continues by reading the block from the local cache. In step 304, the cached file version is checked against the external data source's current version to determine whether there is a match. In step 306, the logical block is read if the file version matches. The read data is returned, and query execution continues as normal. In step 308, if the file version does not match, the logical block and all other logical blocks for the file are invalidated and processing continues as if the block was not present in the cache.

In step 310, if the logical block was not found in the cache or the file version is outdated, the entire logical block is read from the external data source. For example, even if the read request is for 2 KB of data, the entire 1 MB logical block that contains the 2 KB is read from the external data source. In step 312, the file version information (e.g., eTag, mtime) is read from the external data source.

In step 314, if the file has other logical blocks cached and the version of that file changed, the file's current version is updated to reflect the version read from this read operation and the file's other logical blocks that were cached and associated with the prior version are invalidated.

In step 316, after receiving data from the external data source, the logical block is saved locally, and a metadata store is updated. In some embodiments, this happens asynchronously with step 318, where the read data is returned and query execution continues as normal.

Figure 4:
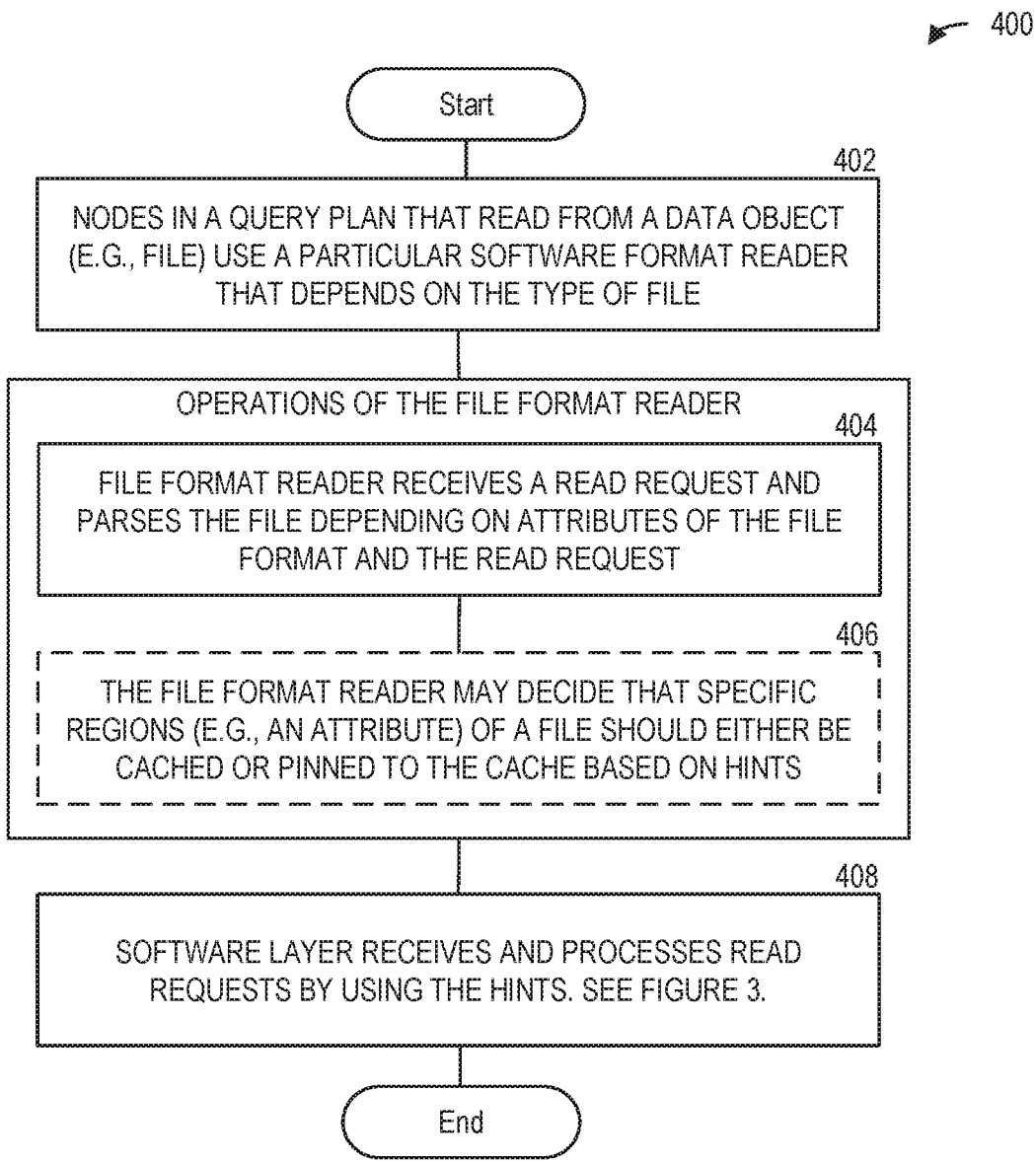
FIG. 4 is a flow diagram that illustrates a process for providing caching hints from higher levels in a software stack according to some embodiments of the present disclosure.

FIG. 4 is a flow diagram that illustrates a process 400 obtaining caching hints from higher levels in the software stack. In step 402, nodes identified in a query plan that read from a file use a particular format reader that depends on the type of data file. For example, there is a particular reader configured to read and understand PARQUET files, a particular reader configured to read and understand ORC files, a particular reader configured to read and understand CSV files, and so on.

In step 404, the format reader receives a specific read request and parses the file depending on specific attributes of the file format and the read request, which may involve multiple read operations on the underlying file. For example, for PARQUET files, if the read request is for a specific range of data on a specific column, the following might happen. First, the PARQUET format reader reads the file footer for metadata of the column is stored in the file. Additionally, it may find more information regarding where in the column the given data range of interest is stored. Second, the PARQUET format reader reads specific file segments from the file that contain either the whole column or specific data ranges within the column. Third, each of these read requests of the prior two sub-steps is sent to the storage software layer that handles read requests for specific ranges in the file (e.g., 2 KB of data starting at position x in the file).

In step 406, optionally and dependent on the specifics of the file format, the file format reader may decide that specific regions of a file are "more interesting" and should either be more aggressively kept in cache or pinned to the cache. For example, in PARQUET files, the footer contains metadata and is commonly read in most requests. Accordingly, it makes sense to pin the footer in cache as long as the file has other blocks in cache. If there are additional hints that are determined, those hints are passed with the read request to the storage software layer. The hints provided with read requests can be independent of the logical block size. If, in the PARQUET example above, the PARQUET footer is stored in the last 1.5 MB of the file, then read requests to the footer over that 1.5 MB would contain the hint. The result is that the last two logical blocks comprising 2 MB of data would be tagged to be more aggressively stored. As such, the storage layer does not have to understand specific details about the file format and can support any file format while still benefiting from file specific knowledge known to the file format reader.

In step 408, the software layer receives one or more read requests for specific data regions in the file. As the read requests are received, they are processed as described in the logical block reading section above. The storage software layer can use any hints provided to adjust the cache retention policy for that block.

Processing System

Figure 5:
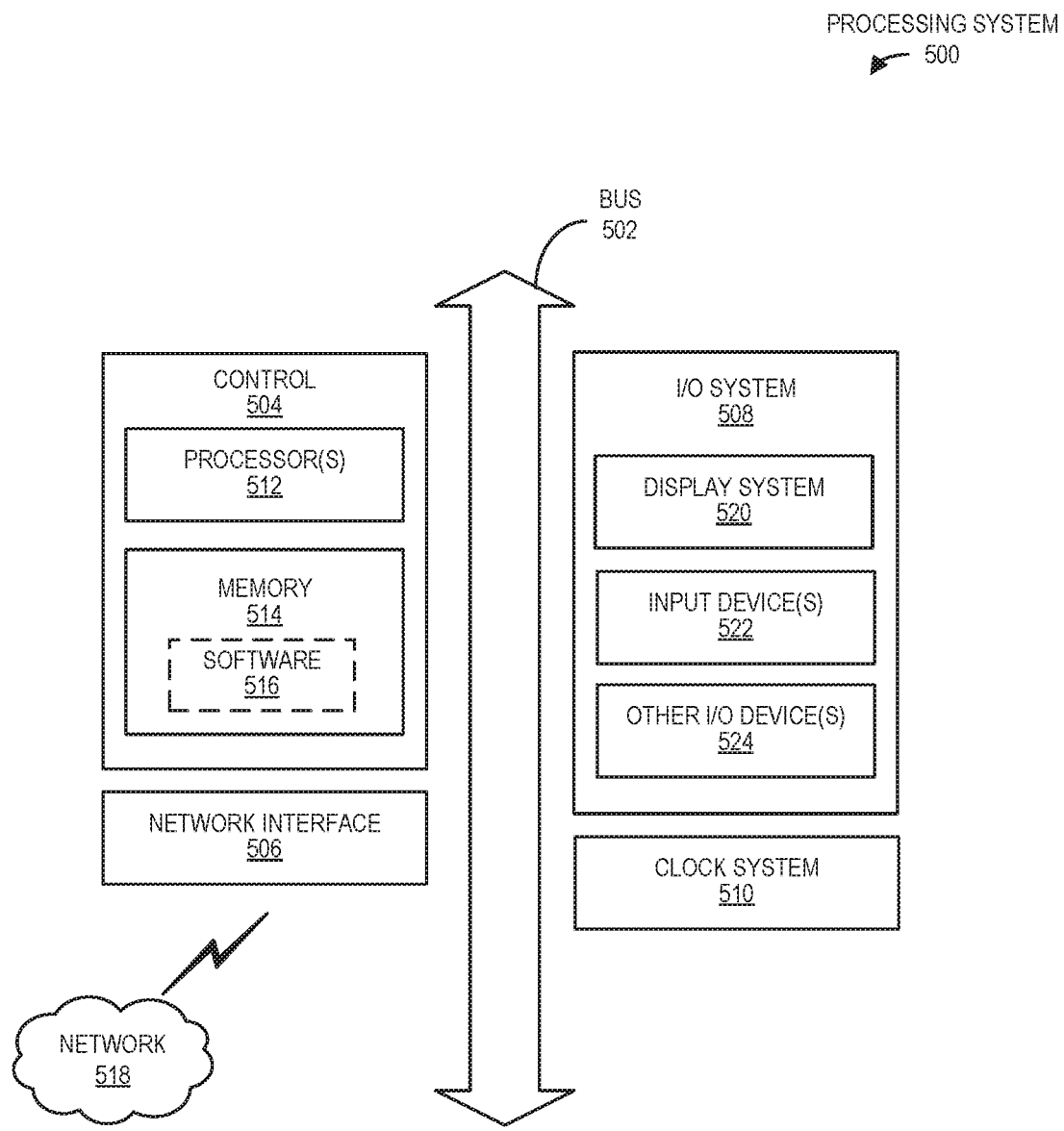
FIG. 5 is a diagrammatic representation of a processing system which can implement aspects of the present disclosure.

FIG. 5 is a diagrammatic representation of a processing system which can implement some embodiments of the present disclosure. Examples include any combination of the components of the data system including a cloud cache. The processing system 500 may be a general computer or a device specifically designed to carry out features of the disclosed technology. The processing system 500 may be a network device, a system-on-chip (SoC), a single-board computer (SBC) system, a desktop or a laptop computer, a kiosk, a mainframe, a mesh of computer systems, a handheld mobile device, or combinations thereof.

The processing system 500 may be a standalone device or part of a distributed system that spans multiple networks, locations, machines, or combinations thereof. In some embodiments, the processing system 500 operates as a server computer (e.g., a network server computer running an analytic engine) or a mobile device (e.g., a user device of an enterprise network) in a networked environment, or a peer machine in a peer-to-peer system. In some embodiments, the processing system 500 may perform one or more steps of the disclosed embodiments in real-time, near-real time, offline, by batch processing, or combinations thereof.

As shown, the processing system 500 includes a bus 502 operable to transfer data between hardware components. These components include a control 504 (i.e., processing system), a network interface 506, an Input/Output (I/O) system 508, and a clock system 510. The processing system 500 may include other components not shown, nor further discussed for the sake of brevity. One having ordinary skill in the art will understand any hardware and software included but not shown in FIG. 5.

The control 504 includes one or more processors 512 (e.g., central processing units (CPUs), application-specific integrated circuits (ASICs), and/or field-programmable gate arrays (FPGAs)) and memory 514 (which may include software 516). The memory 514 may include, for example, volatile memory such as random-access memory (RAM) and/or non-volatile memory such as read-only memory (ROM). The memory 514 can be local, remote, or distributed.

A software program (e.g., software 516), when referred to as "implemented in a computer-readable storage medium," includes computer-readable instructions stored in a memory (e.g., memory 514). A processor (e.g., processor 512) is "configured to execute a software program" when at least one value associated with the software program is stored in a register that is readable by the processor. In some embodiments, routines executed to implement the disclosed embodiments may be implemented as part of operating system (OS) software (e.g., Microsoft Windows, Linux) or a specific software application, component, program, object, module, or sequence of instructions referred to as "computer programs."

As such, the computer programs typically comprise one or more instructions set at various times in various memory devices of a computer (e.g., processing system 500) and which, when read and executed by at least one processor (e.g., processor 512), cause the computer to perform operations to execute features involving the various aspects of the disclosed embodiments. In some embodiments, a carrier containing the aforementioned computer program product is provided. The carrier is one of an electronic signal, an optical signal, a radio signal, or a non-transitory computer-readable storage medium (e.g., the memory 514).

The network interface 506 may include a modem or other interfaces (not shown) for coupling the processing system 500 to other computers over the network 518. The I/O system 508 may operate to control various I/O devices, including peripheral devices such as a display system 520 (e.g., a monitor or touch-sensitive display) and one or more input devices 522 (e.g., a keyboard and/or pointing device). Other I/O devices 524 may include, for example, a disk drive, printer, scanner, or the like. Lastly, the clock system 510 controls a timer for use by the disclosed embodiments.

Operation of a memory device (e.g., memory 514), such as a change in state from a binary one to a binary zero (or vice versa), may comprise a perceptible physical transformation. The transformation may comprise a physical transformation of an article to a different state or thing. For example, a change in state may involve accumulation and storage of charge or release of stored charge. Likewise, a change of state may comprise a physical change or transformation in magnetic orientation, or a physical change or transformation in molecular structure, such as from crystalline to amorphous or vice versa.

Aspects of the disclosed embodiments may be described in terms of algorithms and symbolic representations of operations on data bits stored on memory. These algorithmic descriptions and symbolic representations generally include a sequence of operations leading to a desired result. The operations require physical manipulations of physical quantities. Usually, though not necessarily, these quantities take the form of electric or magnetic signals capable of being stored, transferred, combined, compared, and otherwise manipulated. Customarily, and for convenience, these signals are referred to as bits, values, elements, symbols, characters, terms, numbers, or the like. These and similar terms are associated with physical quantities and are merely convenient labels applied to these quantities.

While embodiments have been described in the context of fully functioning computers, those skilled in the art will appreciate that the various embodiments are capable of being distributed as a program product in a variety of forms, and that the disclosure applies equally regardless of the particular type of machine or computer-readable media used to actually effect the distribution.

While the disclosure has been described in terms of several embodiments, those skilled in the art will recognize that the disclosure is not limited to the embodiments described herein and can be practiced with modifications and alterations within the spirit and scope of the embodiments. Those skilled in the art will also recognize improvements to the embodiments of the present disclosure. All such improvements are considered within the scope of the concepts disclosed herein. Thus, the description is to be regarded as illustrative instead of limiting.

The invention claimed is:

1. A method for caching a data object in a data system, the method comprising:
   obtaining the data object from an external data source;
   caching the data object in a storage location of the data system as a cached data object,
   generating a unit of hashing corresponding to an output of a hash algorithm based on an input indicative of the data object;
   mapping the cached data object to the external data source in accordance with the unit of hashing,
      wherein the cached data object is updatable automatically with the external data source based on the unit of hashing,
   receiving a query configured for reading data stored at the external data source to which the cached data object is mapped in accordance with the unit of hashing,
      wherein a first query result that satisfies the query includes the data object stored at the external data source;
   in response to the query, using the unit of hashing to obtain a second query result that is determined to satisfy the query by reading the cached data object stored in the storage location at the data system instead of reading the data object stored at the external data source,
      wherein the storage location of the cached data object is determined based on the mapping in accordance with unit of hashing; and
   returning the second query result including the cached data object read from the storage location.

2. The method of claim 1 further comprising, prior to caching the data object in the data system:
   automatically selecting the data object for caching in the data system when a frequency of accessing the data object exceeds a threshold.

3. The method of claim 1, wherein the query is a first query, the method further comprises:
   receiving a second query for data stored at the external data source;
   determining that the cached data object is outdated relative to a current data object stored at the external data source; and
   caching the current data object in the data system to replace the cached data object,
      wherein a result that satisfies the second query is obtained from the data system instead of the external data source.

4. The method of claim 1, wherein the input indicative of the data object includes a combination comprising:
   an indication of a cluster of nodes associated with the data object,
   a type of the data object,
   a path and name of the data object, and
   information about a split of the data object.

5. The method of claim 1 further comprising, prior to determining the storage location of the cached data object based on the unit of hashing:
   determining the storage location for caching the data object based on the unit of hashing.

6. The method of claim 1, wherein the input indicative the data object includes a combination comprising:
   an indication of a cluster of nodes associated with the data object,
   a type of the data object,
   a path and name of the data object, or
   information about a split of the data object.

7. The method of claim 1, wherein the input indicative of the data object includes location-dependent information and location-independent information.

8. A method comprising:
   receiving a query configured for reading a data object stored at an external data source,
      wherein a first query result that satisfies the query includes the data object stored at the external data source;
   generating a query plan by parsing the query into a plurality of phases, each phase being configured to read a fragment of the data object from the external data source;
   generating a unit of hashing corresponding to an output of a hash algorithm based on an input indicative of the data object;
   using a unit of hashing to map fragments of the data object of the external data source to a cluster of nodes of a data system;
   generating a read request for the data object in accordance with the unit of hashing to read the fragments of the data object of the external data source;
   processing the read request by the cluster of nodes that divides the data object into discrete logical blocks, the read request using the unit of hashing to determine a link to one or more logical blocks of the external data source and using storage software to read the one or more logical blocks instead of reading the data object stored at the external data source; and
   returning a second query result that is determined to satisfy the query, the second query result including the data object obtained from the one or more logical blocks.

9. The method of claim 8, wherein the discrete logical blocks have a common size and a scope of the read request is greater than the common size.

10. The method of claim 8, wherein the storage software includes a plurality of format readers configured to process a plurality of different types of data objects.

11. The method of claim 8 further comprising, prior to processing the read request:
   performing a lookup process to compare a cached version of the data object with a version of the data object stored at the external data source.

12. The method of claim 8, wherein each node independently maintains a database that only tracks locally stored data objects and associated version information.

13. The method of claim 8, wherein processing the read request by the cluster of nodes comprises:
returning a set of nodes for processing the fragments in proportion to a number of configured rings.

14. The method of claim 13, wherein a load balancer enables multiple rings for a data object so that multiple copies of data objects are cached, and the load balancer maps read requests for a data object to the cluster of nodes.

15. A method comprising:
receiving a query configured for reading a data file stored at an external storage device, the data file being divided into multiple discrete logical blocks and associated with different instances of metadata stored at both a local cache storage device and the external storage device,
wherein the different instances of metadata are mapped between the local cache storage device and the external storage device based on a unit of hashing, and
wherein the unit of hashing corresponds to an output of a hash algorithm based on an input indicative of the data file;
comparing a cached instance of a particular metadata at the local cache storage device with a stored instance of the particular metadata at the external storage device;
determining that the cached instance of the particular metadata is different from the stored instance of the particular metadata;
responsive to determining that the cached instance of the particular metadata is different from the stored instance of the particular metadata, reading the data file stored at the external storage device instead of reading the cached instance of the particular metadata from the local cache storage device;
returning a query result including the data file obtained from the external storage device, the query result being determined to satisfy the query; and
updating the multiple discrete logical blocks of the local cache storage device with the data file obtained from the external storage device, the updated multiple discrete logical blocks include an updated cached instance of the particular metadata.

16. The method of claim 15 further comprising:
receiving another query for the data file;
determining that the updated cached instance of the particular metadata corresponds to the stored instance of the particular metadata;
responsive to determining that the updated cached instance of the particular metadata corresponds to the stored instance of the particular metadata, reading the data file of the local cache storage device; and
returning another query result including the data file obtained from the local cache storage device without reading the data file from the external storage device.

17. The method of claim 15, wherein the different instances of metadata include different versions of the data file.

18. The method of claim 15, wherein processing the query result and updating the multiple discrete logical blocks of the local cache storage device occurs asynchronously.

19. A method comprising:
receiving, by a data system, a read request configured for reading a data file that is stored at a local cache storage;
wherein a copy of the data file is stored at an external data storage,
wherein the data file is stored at a storage location of the local cache storage and mapped to the external data storage based on a unit of hashing, and
wherein the unit of hashing corresponds to an output of a hash algorithm based on an input indicative of the data file;
selecting, by the data system, a particular format reader of a plurality of format readers, the plurality of format readers being configured to read different types of data files, the particular format reader being selected based on a type of the data file in the read request;
modifying, by using the particular format reader, the read request to include an attribute of the data file, the attribute depending on the type of the data file;
parsing, by using the particular format reader, the data file for the read request into discrete logical blocks depending on the type of the data file; and
reading, by using the particular format reader, data of the data file and the attribute stored at the external data storage unless the data file stored at the local cache storage is a current version of the data file stored and the attribute such that the data file and the attribute are read from the local cache storage instead of being read from the external data storage.

20. The method of claim 19 further comprising:
updating the data file and the attribute stored at the local cache storage with the data file and the attribute obtained from the external data storage.

21. The method of claim 19, wherein the plurality of format readers are configured to read an Apache Parquet type file, an optimized row columnar (ORC) type file, and a comma-separated values (CSV) type file.

* * * * *